Patented Dec. 23, 1952

2,623,062

UNITED STATES PATENT OFFICE 2,623,062

METHOD FOR THE PREPARATION OF 1-ACETOXY-1,1-DICYANO-ETHANE

Alan E. Ardis, Cuyahoga Falls, Ohio, assignor to The B. F. Goodrich Company, New York, N. Y., a corporation of New York No Drawing. Application October 28, 1949, Serial No. 124,244

10 Claims. (Cl. 260—465.4)

This invention relates to a novel method for the preparation of 1-acetoxy-1,1-dicyano-ethane (also known as diacetyl cyanide) which method involves the liquid phase, catalytic reaction of acetic anhydride with hydrogen cyanide.

1-acetoxy-1,1-dicyano-ethane has become of considerable industrial importance because of the fact that it can be pyrolyzed to give monomeric vinylidene cyanide, which in turn is of great value in the preparation of synthetic resins particularly useful in making excellent filaments and films. The pyrolysis of 1-acetoxy-1,1-dicyano-ethane to give vinylidene cyanide is described in U. S. Patent 2,476,270.

Heretofore, 1-acetoxy-1,1-dicyano-ethane has been obtained, but only in low yields, by the vapor phase reaction of acetic anhydride and hydrogen cyanide. It has also been prepared by the liquid phase, catalytic reaction of ketene and hydrogen cyanide. However, this latter method presents serious solvent recovery problems and is not suitable for use on a commercial scale. Furthermore, the 1-acetoxy-1,1-dicyano-ethane obtained by this method is not particularly suitable for use in the preparation of vinylidene cyanide since it contains as an impurity 1-cyanovinyl acetate, the presence of which substantially lowers the yields of vinylidene cyanide obtained on subsequent pyrolysis.

Accordingly, it is an object of this invention to prepare pure 1-acetoxy-1,1-dicyano-ethane economically and in good yields from easily procurable raw materials. Other objects will be apparent from the description of the invention given hereinbelow.

I have now discovered that the above and other objects are attained by reacting liquid acetic anhydride and hydrogen cyanide, both of which are low cost raw materials, in the presence of a basic catalyst. By conducting the reaction in the liquid phase in the presence of a basic catalyst excellent yields of high purity 1-acetoxy-1,1-dicyano-ethane are economically obtained.

The reaction of liquid acetic anhydride with hydrogen cyanide in the presence of a basic catalyst proceeds substantially according to the following reaction equation:

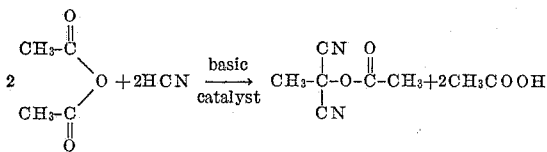

The temperature at which the reaction is car-ried out may be varied considerably. However, when temperatures in excess of about 100° C. are utilized, acetamide and diacetamide are formed and the yields of the desired 1-acetoxy-1,1-dicyano-ethane are appreciably reduced. Accordingly, it is particularly desirable that the reaction be carried out at temperatures below 100° C. and preferably at temperatures in excess of −14° C. (the freezing point of hydrogen cyanide) with the optimum temperature range being from 10 to 70° C. and more preferably from 40° C. to 60° C.

As will be seen from the above reaction equation, two moles of acetic anhydride and two moles of hydrogen cyanide are stoichiometrically required for the reaction to take place. However, a stoichiometric excess of either of the two reactants may also be utilized; in fact slightly higher yields of the desired product are obtained when an excess of acetic anhydride, for example, about 1.2 to 2.0 moles for each mole of hydrogen cyanide, is present.

The basic catalyst which is utilized in the reaction may be either organic or inorganic. Especially suitable are tertiary amines such as trimethylamine, triethylamine, tributylamine, hexamethylene tetramine, pyridine and the like, and alkali metal salts of organic monocarboxylic acids such as sodium acetate, sodium propionate, sodium butyrate, potassium acetate and the like. However, secondary amines such as dimethylamine, diethylamine and the like and other organic and inorganic bases including sodium hydroxide, potassium hydroxide, ammonium hydroxide, quaternary ammonium bases, etc. are also useful, it being understood that basic substances in general are operative. The amount of catalyst used is likewise not a critical factor and may be varied considerably. In general, however, from .5% to 5% of catalyst, based on the total weight of the reactants, is employed.

The reaction itself may be carried out in a number of different ways. For example, one method consists in first mixing together the catalyst and the liquid acetic anhydride and then bubbling gaseous hydrogen cyanide into this mixture while maintaining the reaction temperature within the desired range by the use of external cooling means, which is necessary since the reaction is exothermic. This method of carrying out the reaction is preferred since with gradual addition of the gaseous hydrogen cyanide, less heat is evolved and temperature control is facilitated. This procedure is by no means a critical expedient in itself, however, and if desired, the entire amounts of both reactants and the catalyst may be mixed together at the same time. Alternatively, the liquid acetic anhydride may be added to liquid hydrogen cyanide or liquid hydrogen cyanide added to liquid acetic anhydride. The reaction may also be carried out in presence of inert solvents or diluents such as benzene, nitrobenzene, dioxane, and the like.

When the reaction is complete, as evidenced by cessation of heat evolution, the 1-acetoxy-1,1-dicyano-ethane is recovered from the reaction mixture, which contains also acetic acid and may contain unreacted hydrogen cyanide and acetic anhydride, by a simple distillation, preferably at reduced pressures or by other conventional methods of separation.

The following examples are intended to illustrate the practice of the invention, but are not to be construed as a limitation upon the scope thereof, for there are, of course, numerous possible variations and modifications. In the examples all parts are by weight.

*Example I*

50 parts of liquid acetic anhydride and 0.7 part of triethylamine are mixed together. 21 parts of hydrogen cyanide are slowly bubbled into this mixture over a period of 30 minutes, the temperature of the reaction mixture being maintained at 50° C. to 60° C. by means of an ice bath. The reaction mixture is then distilled to give an acetic acid fraction, a fraction containing 38 parts of acetic anhydride, which may be recycled, and a fraction containing 8 parts (96% yield, based on the amount of acetic anhydride consumed) of substantially pure 1-acetoxy-1,1-dicyano-ethane (B. P. 98° C./12 mm.). The conversion based on total acetic anhydride used is 24%. The acetic acid fraction is in reality an azeotropic mixture of acetic acid and the triethylamine catalyst (B. P. 163° C.) and may be recycled, if desired.

*Example II*

52 parts of liquid acetic anhydride, 0.7 part of sodium acetate and 245 parts of hydrogen cyanide are reacted as in Example I. A 66% yield of 1-acetoxy-1,1-dicyano-ethane is obtained and the conversion of acetic anhydride to 1-acetoxy-1,1-dicyano-ethane is 27%.

*Example III*

Molar quantities of liquid acetic anhydride and hydrogen cyanide and 0.5% triethylamine (based on weight of acetic anhydride charged) are placed in a stainless steel reactor and the temperature of the mixture is maintained at 50° C. for four hours. The reaction mixture is then fractionated at 10 mm. The yield of 1-acetoxy-1,1-dicyano-ethane is 72.1% and the conversion is 31.4%.

*Example IV*

Example III is repeated except that the reactants are placed in 50% by weight of the total charge of benzene. A 75.5% yield of 1-acetoxy-1,1-dicyano-ethane is obtained. The conversion is 36.2%.

*Example V*

Example III is repeated except that a 25% molar excess of acetic anhydride is utilized. A conversion of 38.6% is obtained.

When the above examples are repeated utilizing other temperatures within the range of 10 to 70° C. and other basic catalysts, the results obtained are generally equivalent to those disclosed in the examples. Moreover, when other of the reaction procedures disclosed hereinabove are employed, excellent results are achieved.

In addition to being useful in the preparation of vinylidene cyanide, 1-acetoxy-1,1-dicyano-ethane prepared according to the method of this invention is also useful for other purposes. For example, it possesses insecticidal, fungicidal and herbicidal properties as well as being a valuable intermediate in other chemical syntheses.

Although specific examples are included herein, it is not intended to limit the invention thereto, for numerous variations and modifications will be apparent to those skilled in the art, and are included within the scope of the appended claims.

I claim:

1. The method which comprises bringing together reactants consisting of liquid acetic anhydride and hydrogen cyanide, in the presence of from 0.5% to 5.0% by weight, based on the total weight of the reactants, of a basic catalyst, whereupon chemical reaction occurs between the said acetic anhydride and the hydrogen cyanide, thereby to obtain 1-acetoxy-1,1-dicyano-ethane.

2. The method comprises bringing together reactants consisting of liquid acetic anhydride and hydrogen cyanide, in the presence of from 0.5% to 5.0% by weight, based on the total weight of the reactants, of a basic catalyst and at a temperature of from −14° C. to 100° C., whereupon chemical reaction occurs between the said acetic anhydride and the hydrogen cyanide, thereby to obtain 1-acetoxy-1,1-dicyano-ethane.

3. The method which comprises bringing together in the liquid phase reactants consisting of liquid acetic anhydride and hydrogen cyanide, in the presence of from 0.5% to 5.0% by weight, based on the total weight of the reactants, of a basic catalyst and at a temperature of from 40° C. to 60° C., whereupon chemical reaction occurs between the said acetic anhydride and the hydrogen cyanide, and recovering 1-acetoxy-1,1-dicyano-ethane from the resulting reaction mixture.

4. The method which comprises bringing together in the liquid phase reactants consisting of liquid acetic anhydride and hydrogen cyanide, in the presence of from 0.5% to 5.0% by weight, based on the total weight of the reactants, of an organic basic catalyst and at a temperature of from 10° C. to 70° C., whereupon chemical reaction occurs between the said acetic anhydride and the hydrogen cyanide, and recovering 1-acetoxy-1,1-dicyano-ethane from the resulting reaction mixture.

5. The method which comprises bringing together in the liquid phase reactants consisting of liquid acetic anhydride and hydrogen cyanide, in the presence of from 0.5% to 5.0% by weight, based on the total weight of the reactants, of an inorganic basic catalyst and at a temperature of from 10° C. to 70° C., whereupon chemical reaction occurs between the said acetic anhydride and the hydrogen cyanide, and recovering 1-acetoxy-1,1-dicyano-ethane from the resulting reaction mixture.

6. The method which comprises bringing together in the liquid phase reactants consisting of liquid acetic anhydride and hydrogen cyanide, in the presence of from 0.5% to 5.0% by weight, based on the total weight of the reactants, of a tertiary amine catalyst and at a temperature of from 10° C. to 70° C., whereupon chemical reaction occurs between said acetic anhydride and the hydrogen cyanide, and recovering 1-acetoxy- 1,1-dicyano ethane from the resulting reaction mixture.

7. The method which comprises bringing together in the liquid phase reactants consisting of liquid acetic anhydride and hydrogen cyanide, in the presence of from 0.5% to 5.0% by weight, based on the total weight of the reactants, of triethylamine and at a temperature of from 40° C. to 60° C., whereupon chemical reaction occurs between said acetic anhydride and the hydrogen cyanide, and recovering 1-acetoxy-1,1-dicyano-ethane from the resulting reaction mixture.

8. The method which comprises bringing together in the liquid phase reactants consisting of liquid acetic anhydride and hydrogen cyanide, in the presence of from 0.5% to 5.0% by weight, based on the total weight of the reactants, of sodium acetate and at a temperature of from 10° C. to 70° C., whereupon chemical reaction occurs between said acetic anhydride and the hydrogen cyanide, and recovering 1-acetoxy-1,1-dicyano-ethane from the resulting reaction mixture.

9. The method which comprises mixing together liquid acetic anhydride and from 0.5% to 5.0% by weight, based on the total weight of the reactants, of triethylamine catalyst, bubbling hydrogen cyanide into the resulting liquid mixture while maintaining said liquid mixture at a temperature of from 50° C. to 60° C., whereupon chemical reaction occurs between said acetic anhydride and the hydrogen cyanide and recovering 1-acetoxy-1,1-dicyano-ethane by distillation of the resulting reaction mixture.

10. The method which comprises mixing together liquid acetic anhydride and from 0.5% to 5.0% by weight, based on the total weight of the reactants, of sodium acetate catalyst, bubbling hydrogen cyanide into the resulting liquid mixture while maintaining said liquid mixture at a temperature of from 50° C. to 60° C., whereupon chemical reaction occurs between said acetic anhydride and the hydrogen cyanide, and recovering 1-acetoxy-1,1-dicyano-ethane by distillation of the resulting reaction mixture.

ALAN E. ARDIS.

REFERENCES CITED

The following references are of record in the file of this patent:

UNITED STATES PATENTS

| Number | Name | Date |
|---|---|---|
| 2,395,930 | Johnston et al. | Mar. 5, 1946 |
| 2,426,014 | Gresham | Aug. 19, 1947 |

FOREIGN PATENTS

| Number | Country | Date |
|---|---|---|
| 236,224 | Switzerland | June 1, 1945 |

OTHER REFERENCES

Hubner: Liebig's Ann., vol. 120, p. 335 (1861).

Hubner: Liebig's Ann., vol. 124, pp. 315–323 (1862).

Kleeman: Ber. Deut. Chem., vol. 18, pp. 256–257 (1885).

Brunner: Beilstein, (Handbuch, 4th ed.), vol. 3, p. 441 (1921).